(12) United States Patent
Stout et al.

(10) Patent No.: US 10,233,079 B2
(45) Date of Patent: Mar. 19, 2019

(54) HEATING METHODS FOR ALUMINUM HYDRIDE PRODUCTION

(71) Applicant: Ardica Technologies, Inc., San Francisco, CA (US)

(72) Inventors: David Stout, Palo Alto, CA (US); Elisabeth McLaughlin, Millbrae, CA (US); Henry Fong, Menlo Park, CA (US); Georgina Hum, Palo Alto, CA (US); Paul E. Penwell, Menlo Park, CA (US); Robert Wilson, Palo Alto, CA (US); Mark A. Petrie, Santa Clara, CA (US)

(73) Assignee: Ardica Technologies, Inc., San Francisco, CA (US)

( * ) Notice: Subject to any disclaimer, the term of this patent is extended or adjusted under 35 U.S.C. 154(b) by 0 days.

(21) Appl. No.: 15/183,626

(22) Filed: Jun. 15, 2016

(65) Prior Publication Data
US 2016/0297678 A1  Oct. 13, 2016

Related U.S. Application Data

(63) Continuation-in-part of application No. 13/671,090, filed on Nov. 7, 2012, now Pat. No. 9,676,625.

(60) Provisional application No. 61/556,738, filed on Nov. 7, 2011, provisional application No. 62/181,125, filed on Jun. 17, 2015, provisional application No. 62/265,806, filed on Dec. 10, 2015, provisional application No. 62/181,127, filed on Jun. 17, 2015.

(51) Int. Cl.
*C01B 6/06* (2006.01)
*B01J 19/02* (2006.01)

(52) U.S. Cl.
CPC ............ *C01B 6/06* (2013.01); *B01J 19/02* (2013.01); *B01J 2219/0059* (2013.01); *B01J 2219/0075* (2013.01); *B01J 2219/00495* (2013.01); *B01J 2219/00716* (2013.01); *B01J 2219/0245* (2013.01)

(58) Field of Classification Search
None
See application file for complete search history.

(56) References Cited

U.S. PATENT DOCUMENTS

| | | | |
|---|---|---|---|
| 3,032,037 A | 5/1962 | Havirco et al. |
| 3,129,163 A | 4/1964 | Stern et al. |
| 3,184,528 A | 5/1965 | Norwalk |
| 3,801,657 A | 4/1974 | Scruggs |
| 3,801,707 A | 4/1974 | Ardis et al. |
| 3,810,974 A | 5/1974 | King et al. |
| 3,812,244 A | 5/1974 | Schmidt et al. |
| 3,816,192 A | 6/1974 | Brower et al. |
| 3,819,335 A | 6/1974 | Daniels et al. |
| 3,819,819 A | 6/1974 | Matzek et al. |
| 3,821,044 A | 6/1974 | Roberts |
| 3,823,226 A | 7/1974 | Brower et al. |
| 3,826,820 A | 7/1974 | Roberts et al. |
| 3,838,194 A | 9/1974 | Reigler et al. |
| 3,838,195 A | 9/1974 | Reigler et al. |
| 3,840,654 A | 10/1974 | Schmidt et al. |
| 3,843,774 A | 10/1974 | York et al. |
| 3,850,709 A | 11/1974 | Schmidt |
| 3,857,930 A | 12/1974 | Kraus et al. |
| 3,869,544 A | 3/1975 | Niles et al. |
| 3,869,545 A | 3/1975 | Terada et al. |
| 3,883,644 A | 5/1975 | Matzek et al. |
| 4,006,095 A | 2/1977 | Hoffman et al. |
| 4,048,087 A | 9/1977 | Daniels et al. |
| 4,370,294 A | 1/1983 | Franken et al. |
| 4,395,219 A | 7/1983 | Franken et al. |
| 4,747,701 A | 5/1988 | Perkins |
| 5,292,387 A | 3/1994 | Highsmith et al. |
| 5,670,129 A | 9/1997 | Klapdor et al. |
| 5,730,952 A | 3/1998 | Rathman et al. |
| 6,228,338 B1 | 5/2001 | Petrie et al. |
| 6,617,064 B2 | 9/2003 | Petrie et al. |
| 7,238,336 B2 | 7/2007 | Lund et al. |
| 7,521,037 B1 | 4/2009 | Graetz et al. |
| 9,228,267 B1 | 1/2016 | Crouch-Baker |
| 9,327,974 B1 | 5/2016 | Petrie |

(Continued)

FOREIGN PATENT DOCUMENTS

| DE | 10392795 T5 | 6/2005 |
|---|---|---|
| GB | 833646 A | 4/1960 |

(Continued)

OTHER PUBLICATIONS

Norman W. Krase and J. B. Goodman, Vapor Pressure of Toluene up to the Critical Temperature, Industrial and Engineering Chemistry, Jan. 1930, p. 13.*
Couper et al. Chemical Process Equipment, Chapter 3 Process Control, 2010.*
Finholt, A. E. et al., "Lithium Aluminum Hydride, Aluminum Hydride and Lithium Gallium Hydride and Some of Their Applications in Organic and Inorganic Chemistry," J. Am. Chem. Soc., 69:1199-1203, May 1947.
Rice Jr., M. J. et al., Contract ONR-494(04) ASTIA No. 106967, U.S. Office of Naval Research. 1956. (copy unavailable).

(Continued)

*Primary Examiner* — Robert T Butcher
(74) *Attorney, Agent, or Firm* — Carr & Ferrell LLP

(57) ABSTRACT

Disclosed herein are systems and methods for heating alane etherate compositions for producing microcrystalline alpha alane. An exemplary heating method comprises introducing a preheated solvent into the alane etherate composition and rapidly stirring to effectuate rapid heating of the composition without the need to heat the reactor walls. In this way, the alane etherate composition can be heated while also reducing the risk of decomposition. In further embodiments, a two-stage reactor can be employed for producing alpha alane, wherein the heating occurs in the second stage.

15 Claims, 3 Drawing Sheets

(56) References Cited

U.S. PATENT DOCUMENTS

| | | | |
|---|---|---|---|
| 9,676,625 B1 | 6/2017 | Petrie et al. | |
| 2001/0038821 A1 | 11/2001 | Petrie et al. | |
| 2006/0249393 A1 | 11/2006 | Ghosh et al. | |
| 2007/0056970 A1 | 3/2007 | Scherer et al. | |
| 2007/0066839 A1* | 3/2007 | Lund | C01B 6/06 556/187 |
| 2008/0216906 A1 | 9/2008 | Curello et al. | |
| 2009/0038954 A1 | 2/2009 | Zidan | |
| 2009/0074631 A1* | 3/2009 | Longo | B01J 3/048 422/186 |
| 2009/0291045 A1 | 11/2009 | Graetz et al. | |
| 2010/0252444 A1 | 10/2010 | Vajo et al. | |
| 2012/0017439 A1 | 1/2012 | Yamamoto et al. | |
| 2012/0141363 A1 | 6/2012 | Zidan et al. | |
| 2016/0115602 A1 | 4/2016 | Crouch-Baker et al. | |
| 2016/0368768 A1 | 12/2016 | Stout et al. | |
| 2017/0275163 A1 | 9/2017 | Petrie et al. | |
| 2018/0155195 A1 | 6/2018 | Stout et al. | |

FOREIGN PATENT DOCUMENTS

| | | |
|---|---|---|
| GB | 2281059 A | 2/1995 |
| WO | WO2012018640 A1 | 2/2012 |

OTHER PUBLICATIONS

Tskhai, A. N. et al., "The Kinetics and a Mathematical Model of the Isothermal Crystallisation of Aluminum Hydride from Ether-Toluene Solutions," Russian Journal of Inorganic Chemistry, 37(8):877-885. 1992. (copy unavailable).

Brower, F. M. et al., "Preparation and Properties of Aluminum Hydride," Journal of the American Chemical Society, 98(9):2450. Apr. 28, 1976.

Bulychev, B. M. et al. (1998), "Complex Compounds of Aluminum Hydride Ethoxide with Mixed Aluminum and Boron Hydrides of Lithium and Magnesium: Compositions, Physicochemical Properties, and Synthesis of Unsolvated Aluminum Hydride," Russian Journal of Inorganic Chemistry, 43(5):752-758 and 43:829. (copy unavailable).

Zakharov, V. V. et al. (1992), "The Thermal Transformations of Ether Addition Compounds of Aluminum Hydride," Russian Journal of Inorganic Chemistry, 37(9):997-1005. (copy unavailable).

International Search Report and Written Opinion dated Jan. 17, 2012 in Patent Cooperation Treaty Application No. PCT/US2011/045407, filed Jul. 26, 2011.

Petrie et al., "Synthesis of Microcrystalline Alpha Alane," Utility U.S. Appl. No. 13/671,090, filed Nov. 7, 2012. 16 pages.

* cited by examiner

US 10,233,079 B2

HEATING METHODS FOR ALUMINUM HYDRIDE PRODUCTION

CROSS-REFERENCE TO RELATED APPLICATIONS

This application is a continuation-in-part of, and claims the priority benefit of, U.S. patent application Ser. No. 13/671,090 filed on Nov. 7, 2012 and entitled "Synthesis of Microcrystalline Alpha Alane", now U.S. Pat. No. 9,676,625 issued on Jun. 13, 2017; which in turn claims the priority benefit of U.S. Provisional Patent Application No. 61/556,738 filed on Nov. 7, 2011 and entitled "Synthesis of Microcrystalline Alpha Alane".

This application also claims the priority benefit of U.S. Provisional Patent Application No. 62/181,125 filed on Jun. 17, 2015 and entitled "Heating Methods for Aluminum Hydride Production" and the priority benefit of U.S. Provisional Patent Application No. 62/265,806 filed on Dec. 10, 2015 and entitled "Heating Methods for Aluminum Hydride Production". Further, this application claims the priority benefit of U.S. Provisional Patent Application No. 62/181,127 filed on Jun. 17, 2015 and entitled "Continuous Crystallization Reactor for Aluminum Hydride Production".

In addition, this application is related to U.S. patent application Ser. No. 09/823,379 filed on Mar. 29, 2001, now issued as U.S. Pat. No. 6,617,064 issued Sep. 9, 2003, and entitled "Stabilized Aluminum Hydride Polymorphs". This application is also related to U.S. patent application Ser. No. 09/334,359 filed on Jun. 16, 1999, now issued as U.S. Pat. No. 6,228,338 issued May 8, 2001 and entitled "Preparation of Aluminum Hydride Polymorphs, Particularly Stabilized $\alpha$-$ALH_3$". This application is further related to co-pending U.S. patent application Ser. No. 15/184,962 filed on Jun. 16, 2016 and entitled "Crystallization and Stabilization in the Synthesis of Microcrystalline Alpha Alane".

The disclosures of all of the above patents and applications are hereby incorporated by reference in their entirety.

TECHNICAL FIELD

The present disclosure relates generally to methods for producing aluminum hydride ($AlH_3$), also known as alane.

BACKGROUND

Economical production of aluminum hydride ($AlH_3$) or "alane" depends on an approach that combines aluminum with hydrogen in a manner that is energy efficient and practical. However, the rate of direct reaction between pure aluminum and hydrogen is very slow. A major barrier to this reaction is that little change in enthalpic energy ($\Delta H_f = -2.37$ kcal/mol $AlH_3$) occurs in the transformation of elemental aluminum and hydrogen to aluminum hydride. The ordered nature of the crystalline aluminum metal also inhibits reaction with hydrogen. Another barrier is that the aluminum oxide ($Al_2O_3$) coating that forms on the surface of aluminum when it comes in contact with air, reduces or limits the surface area of the reactive aluminum and inhibits the reaction with hydrogen.

Methods for macrocrystalline alane synthesis are inefficient for producing large quantities of aluminum hydride ($AlH_3$), also known as alane. These methods are problematic when production of a specific alane polymorph is required, such as alpha alane. Various factors, including the large amounts of solvent required as described in the patent literature for the synthesis of the alpha polymorph of alane, and the instability of the produced chemical, hinder the large-scale production of this material by these routes. Various methods that improve the process for producing stable aluminum hydride are disclosed herein.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

Various embodiments of the present disclosure may be directed to methods for heating alane etherate compositions to efficiently produce microcrystalline alpha alane. In an exemplary embodiment, a heated solvent, such toluene, is introduced into the alane etherate composition and stirred rapidly to heat the composition from the solution bulk outwards to the reactor walls.

Other embodiments of the present disclosure allow for the use of a two-stage reactor for producing microcrystalline alpha alane. The first stage may be a batch process and the second stage may be a continuous flow process.

Other features, examples, and embodiments are described below.

BRIEF DESCRIPTION OF THE DRAWINGS

Certain embodiments of the present disclosure are illustrated by the accompanying figures. It will be understood that the figures are not necessarily to scale and that details not necessary for an understanding of the disclosure or that render other details difficult to perceive may be omitted. It will be understood that the disclosure is not necessarily limited to the particular embodiments illustrated herein. Embodiments are illustrated by way of example and not by limitation in the figures of the accompanying drawings.

DESCRIPTION OF EXEMPLARY EMBODIMENTS

Figure 1:
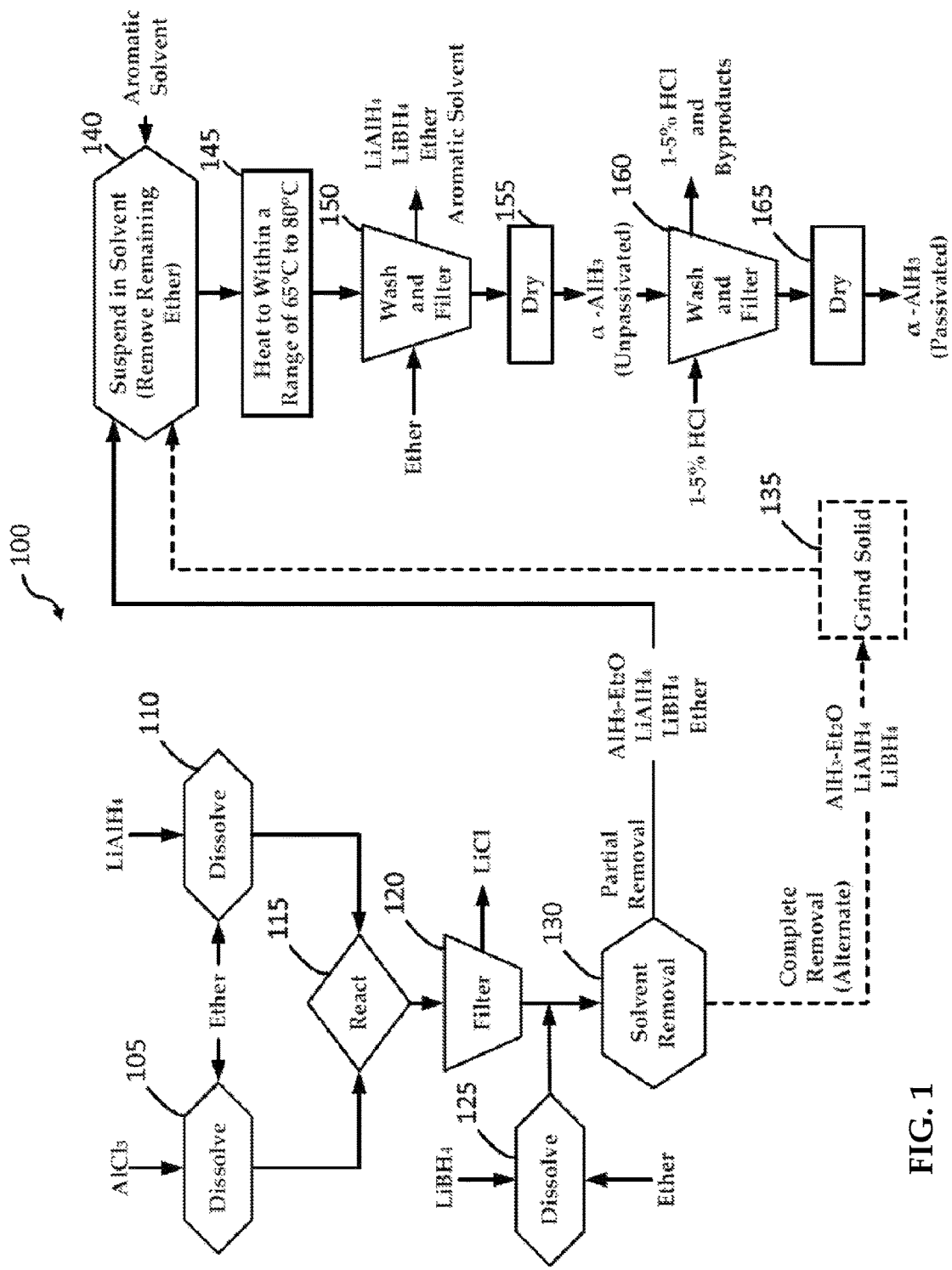
FIG. 1 is a flow diagram of an exemplary process for producing microcrystalline $\alpha$-alane.

The following detailed description includes references to the accompanying drawings, which form a part of the detailed description. The drawings show illustrations, in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

Before the present methods, compounds and compositions are disclosed and described, it is to be understood that unless otherwise indicated this disclosure is not limited to the use of specific reagents, reaction conditions, composition components, or the like, as such may vary. It is also to be understood that the terminology used herein is for the purpose of describing particular embodiments only and is not intended to be limiting.

As used in the specification herein, the singular forms "a," "an" and "the" include plural referents unless the context clearly dictates otherwise. Thus, for example, reference to "a stabilizing agent" includes mixtures of stabilizing agents. Also, reference to "alane" can refer to more than one polymorph of $AlH_3$, and the like.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Additionally, ranges described or claimed herein are inclusive of their end points. Moreover, the end points are inclusive of suitable fluctuations allowing for reasonable and approximate values that fall near end points.

As used herein, the term "alane" refers to aluminum hydride, having the formula $AlH_3$, and includes all the polymorphs such as $\alpha$-$AlH_3$, $\alpha'$-$AlH_3$, $\delta$-$AlH_3$, and the like.

The term "stabilizing agent" refers to compound that tends to inhibit the decomposition of $\alpha$-alane. The stabilizing agent can be an electron acceptor, an electron donor, or a compound which coordinates to the $Al_3^+$ ion.

The term "stabilized" when used to refer to the $\alpha$-alane product of the disclosure indicates that the product is substantially more stable than $\alpha$-alane products of the prior art (i.e., $\alpha$-alane prepared without the use of an acid wash workup and/or without stabilizing agents as disclosed herein). That is, "unstabilized" $\alpha$-alane rapidly decomposes to hydrogen and aluminum, while the stabilized $\alpha$-alane of the disclosure does not. "Stability" refers to both thermal stability and stability at ambient temperature. With respect to thermal stability, the "stabilized" $\alpha$-alane of the disclosure is less than 1% decomposed after twelve days at 60° C., while decomposition of the unstabilized product at that point is virtually complete.

Alpha alane (also referred to as aluminum hydride) is a stable compound that may be used as a hydrogen source in fuel cells and batteries, among other applications. It can be produced in a 2-stage chemical reaction. In the first stage reaction, alane etherate adduct is created: $AlCl_3 + 3LiAlH_4 + Et_2O \rightarrow 4AlH_3 \cdot Et_2O + 3LiCl$. In the second stage reaction, alpha alane is generated by a thermal conversion to drive off the ether portion of the alane etherate adduct to yield a solid form of alane: $AlH_3 \cdot Et_2O \rightarrow \alpha$-$AlH_3$. While various forms of alane exist, it is critical to yield the alpha form for this application, as other forms of alane are less stable. The two stages of the reactions must be carried out carefully, or the reactions will yield either just Al metal, or a mixture of $AlH_3$ with Al metal, which is difficult to handle and unstable. Furthermore, substantially pure alpha alane is needed to be able to do a later step of passivation so that the alane can be used as a stable fuel source, especially for a fuel cell.

It is noteworthy that alane etherate is sensitive to temperature. Thus, uneven or incomplete heating may result in the decomposition of alane etherate into aluminum and hydrogen gas, which produces a potentially flammable product. Additionally, heating may cause the alane etherate to transform into various polymorphs. The transformation of alane into its various polymorphs is undesirable when alpha alane synthesis is the desired goal.

There are several different methods for producing alpha alane. One is a solution process which involves the use of a large volume of solvents. This method produces alane in batches, and is thus an expensive and time-consuming process. Various solvents may be used for carrying out the reaction, such as diethyl ether and toluene. Additionally, hot solvents may be used by various heating methods. Nucleation occurs in this process to facilitate the formation of the alane. Careful control of the stirring method of the material in the reactor, ether content in the reactor, heating profile and heating method, along with use of additives are needed to produce substantially pure alpha alane. Other parameters also need to be carefully controlled to generate substantially pure alpha alane in a stable form.

Another method for producing alpha alane is in a slurry process. To remedy uneven heating and the aforementioned resultant deleterious effects, the solids may be combined with a solvent such as toluene to produce a slurry. When heat is applied to the slurry the solvent allows the heat to be evenly distributed throughout the slurry, reducing the decomposition of the alane etherate precursor into aluminum and alternate alane polymorphs.

In the slurry process, the materials in the reactor are much more highly concentrated, and thus a significantly less volume of solvent is needed to carry out the reactions to completion. This allows for production of large quantities of microcrystalline alane at reduced material and capital costs. Alane is still produced in batches. The heating methods and heating profile of this process must be carefully controlled, along with stirring method, ether content, and other parameters. Precipitation aids and methods may also be employed to facilitate the production of the alpha alane, along with crystallization aids. Passivation methods may further be employed to produce a stable form of the alpha alane. The microcrystalline form of alpha alane comprises an enhanced surface area, which provides for enhanced reactivity of the alane. This enhanced reactivity may be reduced via passivation. Additional detail regarding production of microcrystalline alane using a slurry process can be found in U.S. patent application Ser. No. 13/671,090 filed on Nov. 7, 2012, which is hereby incorporated by reference in its entirety.

Passivation may occur by introducing the microcrystals into a non-aqueous solvent such as toluene. In some instances, the slurry of microcrystals and non-aqueous solvent may be combined into a low concentration acidic solution such as between 1 to 5% hydrochloric acid. The microcrystals may also be added directly to the acid solution. This process passivates the surface of the microcrystals by creating an aluminum oxide coating on the surface of the alane. Also, the hydrochloric acid destroys more reactive alane polymorphs as well as residual lithium borohydride and lithium aluminum hydride. Passivated alane is safer to handle than the more reactive alane. Additionally, passivated alane has a longer shelf life compared to un-passivated alane that also can contain impurities that can catalyze the decomposition of the alane and are highly reactive to water and ambient air.

A third method of producing alpha alane is in an electrochemical cell. In this method, an electric field is applied across a solution, causing the positive ions to move toward the negative side of the field and the negative ions to move toward the positive side. The two half-cells of an electrochemical cell are connected by a cell separator that allows ions to move between the half-cells but prevents mixing of the electrolytes. The separator may be a membrane, to selectively allow certain compounds to pass between sides. In a typical electrochemical cell used to produce alane etherate, the rate of alane production is limited by the current flow through the cell.

A fourth method for producing alpha alane is in a continuous process. In this process, one or both stages of the reactions for producing alpha alane may occur in a continuous flow reactor as opposed to a batch reactor. This allows for faster production of the alane along with fewer raw materials to be used (i.e. not as much solvent needed). The continuous process is discussed in further detail below.

Generally speaking, various embodiments may comprise systems and processes for synthesizing microcrystalline alane, preferably the alpha polymorph (α-alane). In some embodiments, exemplary processes may comprise combining excess lithium aluminum hydride ($LiAlH_4$) with an amount of aluminum trichloride ($AlCl_3$) in an ether solvent to produce lithium aluminum hydride, lithium chloride, and alane etherate. Next, the lithium chloride is separated by filtration leaving a composition of ether, alane etherate and lithium aluminum hydride. This mixture may be further processed to remove ether and the resulting solid may be heated to separate the alane from the alane etherate.

Regardless of which method is employed for the production of aluminum hydride, each step of the processes require careful control of numerous parameters. For example, the ether content in the reactor must be controlled so that any residual ether in the reactor is carefully monitored and adjusted. Also the stirring rate of the materials, and heating rate, among other parameters, need to be carefully controlled to create the right conditions for the reaction to proceed properly to yield the specific alpha alane polymorph with optimal thermal stability and particle size.

Production of α-alane

FIG. 1 is a flow diagram of an exemplary process 100 used for alane synthesis according to various embodiments. At steps 105 and 110, the synthesis involves the addition of a solution of aluminum trichloride ($AlCl_3$) to lithium aluminum hydride ($LiAlH_4$) in an ether, such as diethyl ether, to generate at step 115 alane etherate ($AlH_3.Et_2O$) in solution and lithium chloride precipitate. The solubility of alane etherate has an inverse relationship to temperature, and keeping the reaction temperature at within a range of approximately −5° C. to 0° C. reduced the observed premature crystallization at ambient temperature. The concentration of the $AlH_3.Et_2O$ was approximately 0.8 M during filtration at step 120.

Following filtration at step 120, a solution of lithium borohydride ($LiBH_4$) dissolved in 1.0 M of diethyl ether (step 125) is added to the filtered mixture. The $LiBH_4$ may act as an optionally added crystallization aid by improving the size and shape of the alane crystals. The next step involves the removal of most of the diethyl ether solvent by vacuum distillation at step 130. After removal of approximately all visible solvent and pumping under high vacuum for an additional period of time (which in some instances may range from approximately two to three hours), the remaining solid material of approximate composition $LiAlH_4/4AlH_3.1.2Et_2O/LiBH_4$ may be a bright white powder material. This solid material may be ground at step 135 and transferred into a separate flask for heating. Several separate experiments were preformed where only 70-95% of the diethyl ether was removed (indicated as "Partial Removal" in FIG. 1) giving a slurry of the $LiAlH_4/4AlH_3.Et_2O/LiBH_4$ mixture in a minimal amount of diethyl ether.

At step 145, heating of this solid mixture to a temperature that falls within a range of approximately 60° C. to 65° C. for a period of time of approximately four hours and in the presence of a vacuum, converts the alane etherate into α-alane and other products.

Empirical data suggests that heating of the solid mixture resulted in uneven heating, which leads to mixtures of products being formed. As mentioned above, uneven heating may result in decomposition of the alane etherate into aluminum and hydrogen gas, as well as the formation of various alternate alane polymorphs.

Thus, the process 100 may include a step of combining the solid (from step 135) or diethyl ether slurry mixture (from step 130) with an aromatic solvent such as toluene ($C_7H_8$) at step 140 prior to heating at step 145. Other aromatic solvents such as benzene, ethylbenzene, xylene and mixed xylenes, naphthas, and mixtures thereof may also be used. The aromatic solvent may act as a heat sink, for optimal distribution of solids throughout the solvent may allow for better distribution of heat throughout the slurry mixture. Advantageously, even distribution of heat during the heating cycle may provide efficient transformation of the alane etherate into α-alane thereby avoiding the generation of hot spots, which can degrade the alane etherate precursor. In step 140, the remaining ether content may be reduced to approximately 0-10% of the overall solvent content.

The slurry may be heated to a temperature that falls within a range of approximately 72° C. to 80° C., over a period of time of approximately three to six hours. During the heating process alane etherate is transformed into alpha alane. Heating at lower temperatures may result in the decomposition of alane etherate and the generation of alternate alane polymorphs. It will be understood that as the temperature increases, the length of the heating cycle may decrease. The temperature employed in this process is approximately 20° C. lower than used for known methods of producing microcrystalline α-alane, thus significantly reducing energy costs of alane production.

After heating, the solid may be rinsed with an ether, such as diethyl ether, at step 150 which may dissolve the more soluble excess lithium aluminum hydride and lithium borohydride. These crystallization aides may be reused in subsequent batches of alane production. Rinsing and filtering of remaining lithium borohydride and lithium aluminum hydride from the toluene slurry, and subsequent drying at step 155, may provide α-alane in microcrystal form.

Once the aluminum hydride is produced, it may be advantageous to stabilize the aluminum hydride, because aluminum hydride is particularly susceptible to decomposition when exposed to air and/or water. Thus, the method may include a step of stabilizing the aluminum hydride with a solvent. In some instances the aluminum hydride may be combined with a solvent such as diethyl ether or toluene to prevent decomposition. The combination of diethyl ether with the aluminum hydride produces an etherated alane such as aluminum hydride-diethyl etherate. Other ether and amine complexes of aluminum hydride may also be generated.

The microcrystal form of α-alane, comprises an enhanced surface area, which provides for enhanced reactivity of the alane. This enhanced reactivity may be reduced via passivation. Passivated alane is safer to handle than the more reactive alane. Additionally, passivated alane has a longer shelf life compared to un-passivated alane that also can contain impurities that are highly reactive to water and ambient air.

Passivation may occur by introducing the microcrystals into a non-aqueous solvent such as dimethoxyethane or toluene prior to the addition of the aqueous acid. This results in distributing the heat generated during the passivation process. In some instances, the slurry of microcrystals and non-aqueous solvent may be combined into a low concentration mineral acid solution such as between 1 to 5% hydrochloric acid at step 160. Other mineral acids or buffered solutions of these acids may also be used in the passivation step, such as phosphoric acid ($H_3PO_4$), sulfuric acid ($H_2SO_4$), boric acid ($H_3BO_3$), hydrofluoric acid (HF), hydrobromic acid (HBr), hydroiodic acid (HI), and mixtures thereof.

The microcrystals may also be added directly to the acid solution. This process passivates the surface of the microcrystals by creating an aluminum oxide coating on the surface of the alane. Also, the acid passivates or destroys more reactive alane polymorphs as well as any aluminum metal, residual lithium borohydride and lithium aluminum hydride.

After washing and filtering at step 160, the microcrystals may be dried at step 165 producing the passivated α-alane final product. This process may passivate the surface of the microcrystals by creating an aluminum oxide coating on the surface of the alane. Also, the acid may destroy more reactive polymorph alanes as well as residual lithium borohydride and lithium aluminum hydride. Passivated alane is safer to handle than the more reactive alane. Additionally, passivated alane has a longer shelf life compared to unpassivated alane that also can contain impurities that are highly reactive to water and ambient air.

Due to the careful control of reactor conditions required, the reactor needs to be maintained at set temperatures and cannot tolerate undue temperature variations. Further, the reactor contents need to be heated rapidly to convert alane etherate to alpha alane, since the precursors are susceptible to decomposition at lower temperatures. A typical reactor in a continuous system or a commercial system is heated by applying heat to the walls of the reactor, thus causing the heat to diffuse inward to the bulk of the solution. In this method, the walls of the reactor are at a higher temperature than the bulk of the solution contained within the reactor. However, for the production of aluminum hydride, such temperature gradients from the walls of the reactor to the bulk of the solution may hinder the progress of reaction by giving unwanted side products. Furthermore, if the reactor walls are heated to a higher temperature than the solution bulk, aluminum metal plating can result from the reactor walls, which is a catalyst for the decomposition of the intermediates, causing the reactor contents to decompose on the reactor walls. As such, it is necessary to prevent the reactor walls from becoming overly heated in an effort to heat the solution bulk.

Figure 2:
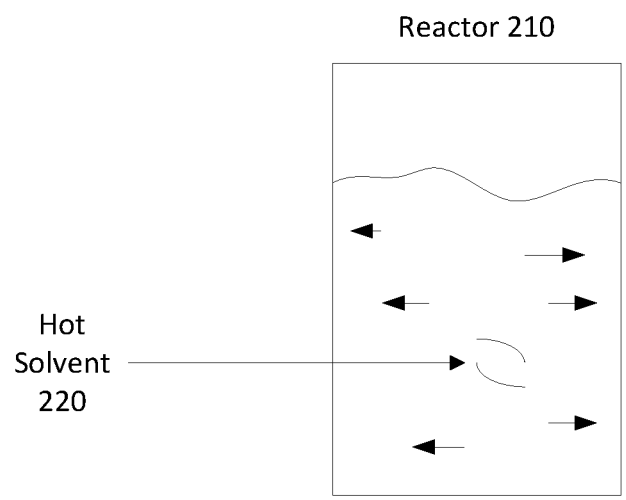
FIG. 2 is an exemplary diagram of introducing a heated solvent into reactor contents.

FIG. 2 depicts an exemplary embodiment of the present disclosure for heating the reactor during the heating stage in 145 of FIG. 1. As shown in FIG. 2, a hot solvent 220 may be injected into the bulk of the reactor 210 and stirred rapidly such that the bulk of the solution is heated at substantially the same rate without having to heat the walls of the reactor to an excessive amount. In this way rapid heating may occur from the solution outward to the reactor walls, rather than from the reactor walls inward to the solution bulk.

In various embodiments, the reactor contents may comprise a viscous alane etherate slurry composed of $LiAlH_4$/$4AlH_3.Et_2O$/$LiBH_4$/ether/toluene.

The hot solvent may be in a liquid or gaseous form, and may further be an inert gas. The hot solvent may be a super-heated solvent vapor. In exemplary embodiments, the hot solvent 220 is at approximately 85-90° C. before being introduced into the reactor 210. Further, the wall temperature of the reactor may be set at a few degrees lower than the temperature of the bulk solution before hot solvent 220 is injected into the bulk solution. By heating the solution bulk rapidly, the gel phase may be overcome quickly or skipped entirely, so that the reaction can move to the phase where the crystals are formed into alpha alane. The hot solvent 220 may comprise a solution of toluene, or another aromatic solvent, mixed with other components. In an exemplary embodiment, hot solvent 220 is a mixture of toluene and ether.

In an exemplary embodiment, hot toluene vapor can be bubbled into the alane etherate slurry in the reactor so that condensation of the toluene into the liquid provides additional heating. In this way, heating may be achieved more rapidly without needing to heat the reactor walls to a high temperature.

Pre-heated toluene vapor can be introduced to the alane etherate slurry as part of a gas feed, with some inert gas, near atmospheric pressure. In various embodiments, the toluene vapor can be present in a gas feed of inert gas in varying compositions, including 0-100% inert gas.

By injecting hot solvent 220 into the reactor 210 rapidly, the reactor contents which are typically around room temperature can be rapidly raised to approximately 68-82° C. In exemplary embodiments of rapid heating, reactor contents of 1-2 L may be heated in approximately <10-15 minutes. After the heating, the hot solvent 220 may be removed from the reactor contents by filtration, such as in step 150 of FIG. 1.

In various embodiments of the present disclosure as shown in step 145 of FIG. 1, the alane etherate may first be prepared as a slurry, with or without crystallization aides, in the presence of diethyl ether and toluene. The slurry may then be injected rapidly or added portion-wise into a preheated toluene solution with or without crystallization aides. The temperature of the preheated toluene may reside over a wide range. Reverse addition of slurry to hot toluene may also occur. In this way, the initial heating of the slurry occurs from the pre-heated toluene solution, and most importantly not in the presence of the heat sensitive alane etherate. Use of a preheated toluene solution avoids the initial large temperature differential on the walls of the reactor required for initial heat up of the reactor, and resulting decomposition of the alane etherate on the walls of the reactor from the initial heat up. Once the addition of the slurry into the preheated toluene solution is complete, the wall temperature of the reactor is then maintained to complete the transition of the alane etherate to the alpha alane phase. This maintenance temperature occurs over a wide range, usually 68° C. to 82° C. The heating may also occur over a two-stage process, starting at a lower temperature and finishing at a higher temperature. As would be understood by a person of ordinary skill in the art, while a preheated toluene solution is described here, other solvents may also be used.

In addition to the heating method of FIG. 2, other heating methods for heating the bulk of the solution may also be employed such as the use of microwave heating, ultrasounds, IR heating, and/or an external heating loop with a filter. With these methods, the solution bulk may be heated to the desired temperature to carry out the reactions without having to heat the walls of the reactor an excessive amount.

In a further exemplary heating method, alane etherate slurry comprising alane etherate, toluene, lithium aluminum hydride and borohydride can be dipped into a hot bath and heated in this manner.

Figure 3:
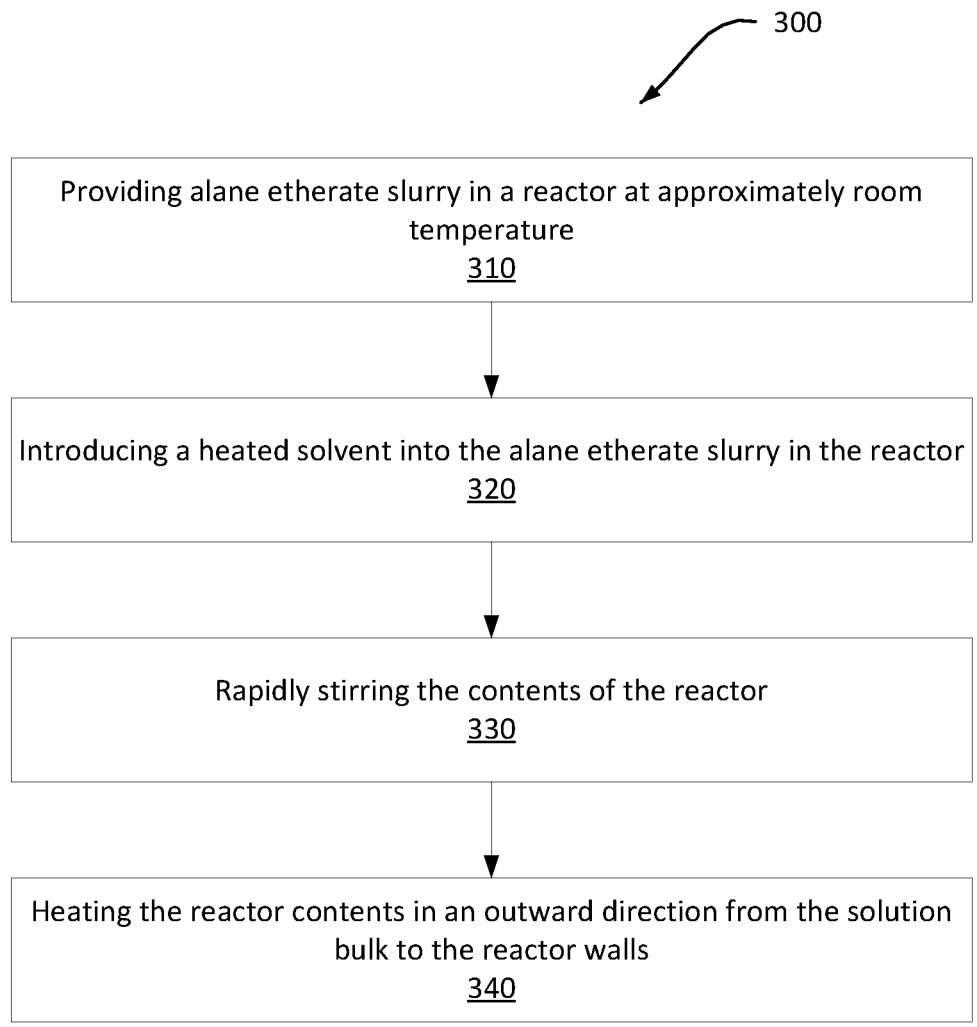
FIG. 3 is a flow chart of an exemplary process for heating an alane etherate composition.

FIG. 3 is a flowchart of an exemplary method 300 for heating an alane etherate composition to produce alpha alane according to various embodiments. In step 310, an alane etherate slurry is provided in a reactor at approximately room temperature. The slurry may be similar to that produced in step 140 of FIG. 1. In step 320, a heated solvent is introduced into the alane etherate slurry in the reactor. In step 330, the contents of the reactor are stirred rapidly such that heat diffusion occurs to heat the reactor contents in an outward direction from the solution bulk to the reactor walls in step 340.

Continuous Process

In a continuous process for producing alpha alane, one or both stages of the reactions for producing alpha alane may occur in a continuous flow reactor as opposed to a batch reactor. This allows for faster production of the alane along with fewer raw materials to be used (i.e. not as much solvent needed). In exemplary embodiments, the reactor may be a continuous crystallization reactor.

A two-stage reactor may also be employed such that the pre-heat stage for producing the aluminum hydride occurs in a semi-batch manner. This batch typically takes about 20-30 minutes for the reaction to complete, and the reactor components are of a gelatinous thickness. The secondary stage of the two-stage reactor may be in a continuous plug flow, as the reactor components are in a flowable slurry. The second stage typically takes about 4 hours for the reaction to complete. Conducting both stages of the aluminum hydride production process in a batch reactor makes the total reaction time for aluminum hydride production to about 5 hours. Employing a continuous flow reactor for the secondary stage reduces the total batch time to approximately 2-3 hours, depending on temperature, thus allowing for more efficient production of more aluminum hydride more quickly. Further, the continuous second stage lowers residence time of the reactor contents, which helps with reducing the amount of decomposition of the reactor contents.

A continuous process for producing alpha alane may also allow for two-stage passivation. Similar to the solution process and the slurry process, careful control of heating methods and heat profile are needed in the reactor, along with other parameters. Various methods for removing ether from the process may be employed. While a single two-stage reactor is discussed herein, two reactors in series may be used for the two-stage process.

In exemplary embodiments, the walls of the two-stage reactor are composed of materials that prevent or reduce the amount of reactor contents sticking to the walls. For example, reactor walls may be composed of various Teflon compositions or fluoropolymer based materials.

The heating methods described above can be used in the continuous reactor, thus allowing for efficient production of microcrystalline alpha alane quickly. Further, the continuous stage of the two-stage reactor may have the reactor contents flowing through a pipe that is heated externally in addition to, or instead of, the introduction of hot solvent into the reactor contents.

In various embodiments of the present invention, a hot solvent may be injected into the bulk of the reactor and stirred rapidly such that the bulk of the solution is heated at substantially the same rate without having to heat the walls of the reactor to an excessive amount. In this way heating may occur from the solution outward to the reactor walls, rather than from the reactor walls inward to the solution bulk. The hot solvent may be in a liquid or gaseous form, and may further be an inert gas. The hot solvent may be a super-heated solvent vapor. The wall temperature of the reactor may be set at a few degrees lower than the temperature of the bulk solution before heat is injected into the bulk solution. By heating the solution bulk, the gel phase may be overcome quickly so that the reaction can move to the phase where the crystals are formed into alpha alane. Furthermore, solvent heating allows the ether out in a membrane reactor type system and allows the slurry to form for the second stage and warm up to the appropriate temperature.

In the secondary stage of the 2-stage reactor for continuous production of aluminum hydride, the heating in the reactor must be controlled carefully to allow time for the alpha alane formation. In exemplary embodiments, IR heating may be employed during this phase.

The flowchart and block diagrams in the Figures illustrate the architecture, functionality, and operation of possible implementations of systems and methods according to various embodiments of the present disclosure. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A process for manufacture of aluminum hydride in a reactor, the process comprising:
    creating a slurry from alane etherate, diethyl ether and toluene;
    combining the slurry with a preheated toluene solution in the reactor, accomplishing initial heating of the slurry by the preheated toluene solution to a temperature of 68° C. to 82° C.;
    applying heat to the reactor to further elevate the temperature of reactor contents; and
    maintaining the temperature of the reactor to hold the reactor contents at the elevated temperature to complete a transition of alane etherate to aluminum hydride.

2. The process of claim 1, wherein the preheated toluene solution is preheated to approximately 85° C.

3. The process of claim 1, wherein the temperature of the reactor contents is elevated to a range of 65° C. -82° C.

4. The process of claim 1, wherein the aluminum hydride is an alpha polymorph of aluminum hydride.

5. The process of claim 1, wherein the slurry further comprises lithium aluminum hydride and lithium borohydride.

6. The process of claim 1, wherein the preheated toluene solution is in gaseous form.

7. The process of claim 1, wherein the preheated toluene solution is in liquid form.

8. The process of claim 1, wherein the applying heat to the reactor further comprises heating the reactor contents in 10 minutes or less to elevate the reactor contents to a temperature range of 68° C. to 82° C.

9. The process of claim 1, wherein the preheated toluene solution comprises toluene vapor and an inert gas.

10. The process of claim 1, wherein the preheated toluene solution comprises toluene and ether.

11. The process of claim 1, wherein the applying heat to the reactor to elevate a temperature of reactor contents comprises applying heat to an external wall of the reactor.

12. The process of claim 1, wherein the applying heat to the reactor to elevate the temperature of reactor contents comprises applying an external heating loop with a filter to the reactor.

13. The process of claim 1, wherein the applying heat to the reactor to elevate the temperature of reactor contents comprises applying microwave heating to elevate the temperature of the reactor contents.

14. The process of claim 1, wherein the applying heat to the reactor to elevate the temperature of reactor contents comprises applying IR heating to elevate the temperature of the reactor contents.

15. The process of claim 1, wherein the applying heat to the reactor to elevate the temperature of the reactor contents is done in 15 minutes or less.

* * * * *